(No Model.)
J. C. McCURRY.
GIN SAW FILING MACHINE.
No. 510,926. Patented Dec. 19, 1893.
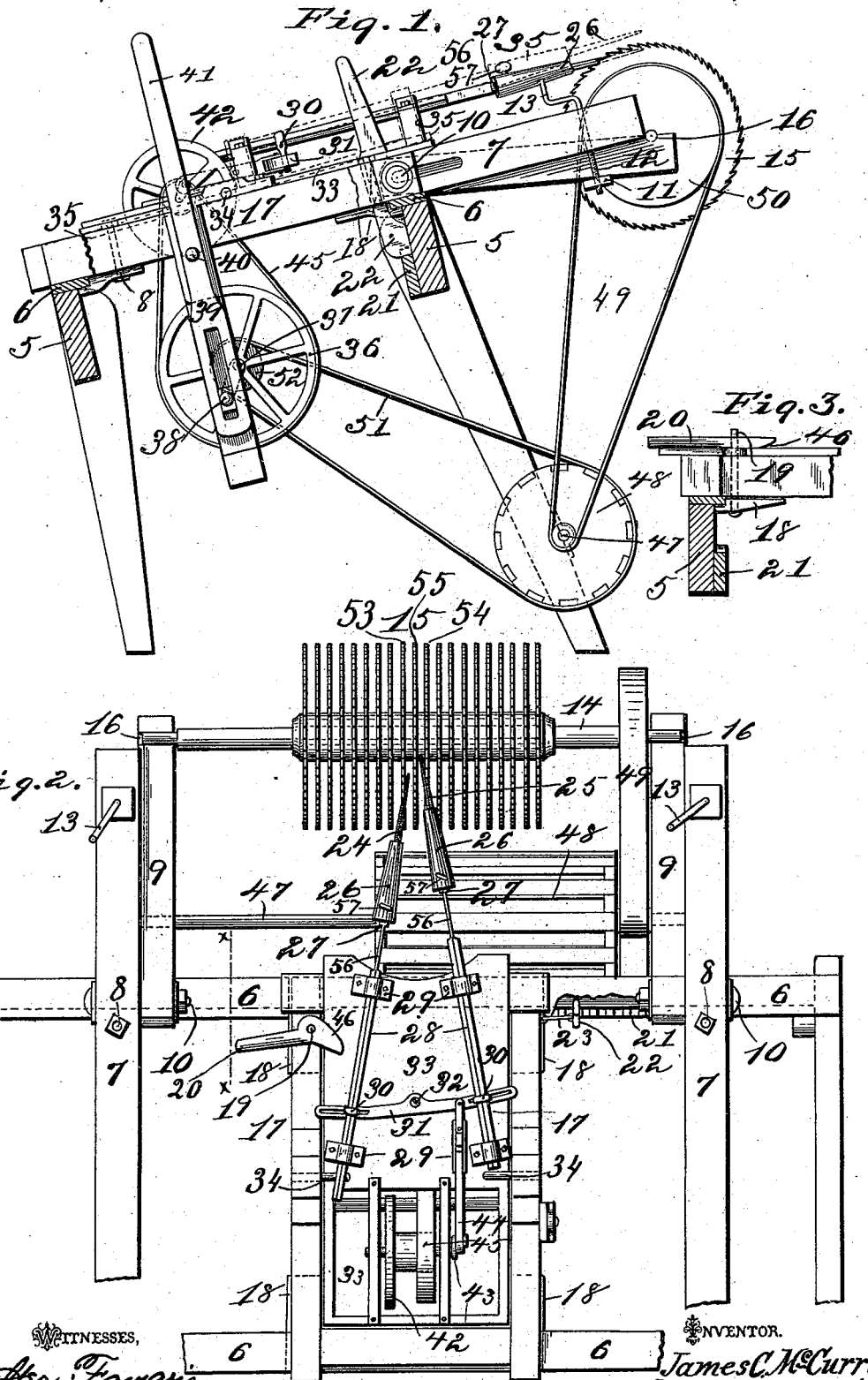
Witnesses,
Walter Farrar
Wm. C. Hillyard
Inventor.
James C. McCurry
by W. B. C. Stevens, Atty.

UNITED STATES PATENT OFFICE.

JAMES C. McCURRY, OF TEXARKANA, TEXAS.

GIN-SAW-FILING MACHINE.

SPECIFICATION forming part of Letters Patent No. 510,926, dated December 19, 1893.

Application filed August 7, 1893. Serial No. 482,629. (No model.)

*To all whom it may concern:*

Be it known that I, JAMES C. MCCURRY, a citizen of the United States, residing at Texarkana, in the county of Bowie and State of Texas, have invented certain new and useful Improvements in Gin-Saw-Filing Machines; and I do hereby declare the following to be a full, clear, and exact description of the invention, such as will enable others skilled in the art to which it appertains to make and use the same.

This invention relates to that class of machines which is designed to file circular saws, and its objects are to provide means for filing saws while mounted side-by-side upon a saw arbor, as cotton gin saws usually are; means for moving the file carriage along upon the frame of the machine to locate it in front of the individual saws which are to be filed; means for raising and carrying the file over the saws when the carriage is to be moved; means for securing the file sash on the file carriage and of securing the file carriage upon the main frame by a single act; and means for converting a continuous rotary feed motion of the saws while being filed, to an intermittent motion which rotates the saws step-by-step from tooth to tooth.

To this end my invention consists in the construction and combination of parts forming a gin saw filing machine, hereinafter described and claimed reference being had to the accompanying drawings, in which—

Figure I, is a transverse vertical section of a gin saw filing machine according to my invention. Fig. II, is a top view of the same. Fig. III, is a section at line *x* Fig. II.

5 represents the main frame of the machine provided with side rails 6, upon which hanger beams 7 are secured by means of adjusting blocks and binding screws 8.

9 represents the hangers pivoted at 10 to the hanger beams 7 and provided each with a projecting lug 11 through which the adjusting screw 12 is threaded, the screw being journaled in the hanger beam and provided with a crank 13 whereby it may be turned.

14 is a saw arbor upon which a number of gin saws 15 are mounted in any usual way.

16 represents notches to serve as bearings for the saw arbor while the saws are being filed, and the hanger beams 7 are adapted by means of adjusting blocks and binding screws 8 to be secured at any point along the side rails 6 to adjust them to the length of any saw arbor.

17 is the file carriage fitted to slide upon the rails 6 and adapted to be secured at any point thereon by means of lugs 18, one of which is loose and is provided with a binding screw 19 having a handle 20 whereby the carriage may be secured at any point on the rails 6.

21 is a toothed rack fixed beneath one of the side rails of the frame, and 22 is a hand lever freely hung to the carriage by means of a link 23, and adapted to engage its lower end with any tooth of the rack as a fulcrum whereby the carriage may be pried along upon the rails 6. This movement of the carriage is controlled entirely at the will of the operator because he pries it along much or little according to the spaces of the gin saws upon the saw arbor.

24 represents a file adapted to file the left-hand side of the teeth of the saws, and 25 is a file adapted to file the right-hand side of the teeth of the saws. These files are secured in handles 26, each of which has a round hole in its rear end to fit upon a cylindrical plunger 27. This plunger is squared along its body 28 where it is fitted to slide in bearings 29, the two bearings of each plunger being so located that the plungers reciprocating therein slide at an acute angle with each other for the purpose of making the saw teeth sharp pointed, and of playing freely beyond the tooth being filed without striking the side of the adjacent saw. Each plunger is provided with a stud 30 engaging a slot in a walking beam 31 which is pivoted at 32 to vibrate upon a sash 33 which is provided with trunnions 34 journaled in the carriage 17, and the bearings 29 are rigidly fixed to the sash 33 so that the files may be raised out of line of the saws by tipping the sash upon its trunnions as shown by dotted lines 35, when the carriage is being moved from one saw to another.

36 represents the drive-wheel journaled at 37 in the carriage 17, and provided with a crank 38 which is engaged by a slotted lever 39 that is pivoted at 40 to the carriage, and provided with a handle 41.

42 is a speed wheel journaled in the sash 33 and provided with a crank 43 which is connected by a pitman 44 with the walking beam 31.

45 is a belt communicating between a drive-wheel 36 and the speed wheel 42. The handle 20 of the binding screw 19 is provided with a cam 46 adapted to engage the sash 33 to hold it in position against being tipped up while the files are at work. When this handle 20 is turned to loosen the binding screw it also turns the cam 46 to set the sash free, and the natural tension upon the belt 45 pulling down upon the rear end of the sash raises the files at the forward end out of line of the saw, thus leaving one hand of the operator free to work the lever 22, whereby the carriage is moved.

47 is the feed shaft journaled in the main frame 5, and 48 is a long drum or pulley mounted upon the shaft 47 to turn therewith.

49 is a belt communicating between the shaft 47 and a large pulley 50 upon the saw arbor 14.

51 is a belt communicating between a small pulley 52 on the shaft of the drive wheel 36 and the drum 48.

The operation is as follows: An arbor 14 having gin saws 15 and pulley 50 mounted upon it, is brought to this machine and one or both of the hangers 7 are to be adjusted along the rails 6 so that the hangers 9 will receive the arbor. The belt 49 is then to be slipped over the pulley 50 and the arbor to be placed in the said bearing. Now by means of the hand crank 13 and adjusting screw 12 the hangers 9 may be raised or lowered to give the saws the right height relative to the files so that the teeth to be sharpened thereby may have the right degree of angular sharpness. If the arbor be raised the teeth will be filed less pointed, and if the arbor be lowered the teeth will be filed more pointed, within certain limits. Now the forward end of the sash 33 is to be brought into position by moving the carriage 17 as described so that the files will operate upon the adjacent sides of two saws 53 and 54 located at each side of an idle saw 55. The word idle means "not being worked upon," and there may be one or more of these idle saws to suit the circumstances. Then the forward end of the sash is to be tipped down and be secured in place by the same act of the handle 20 which operates through the binding screw 19 and loose lug 18 to secure the carriage 17 in position upon the rail 6. Now the operator proceeds to push and pull alternately upon the handle 41, by means of which reciprocating motion, a rotary motion is given to the crank 38 and the drive wheel 36, and a faster rotary motion to the speed wheel 42, whose crank 43 communicates reciprocating motion through the pitman 44 and the walking beam 41 to the plungers 27, and the files 24 and 25 held thereby. A very much slower rotary feed motion is communicated through the belt 49, the drum 48, and belt 51 to the saw arbor 14. It would naturally seem that the saw arbor would thus be given a steady rotary motion so that a mere rough edged disk would be produced instead of a toothed saw, but in operation it is found that if the wheels be so proportioned as to give exactly five strokes of the file to each tooth of the saw, the file will sometimes remain operating in one notch between teeth for six strokes and sometimes only four strokes, but the general average will be five strokes. The revolutions of the saws are not absolutely positive, nor their stoppage at each tooth absolutely rigid, but when the file is in operation in a notch between teeth it holds the saw from revolving until the accumulated strain upon the belt is more than the resistance of the file and then the saw is suddenly jerked forward by recoil of the stretched belt. This sometimes produces a slight variation in the height of the teeth but as the teeth are all made sharp thereby this variation is a natural advantage in the peculiarly irregular work required of the saw in pulling the fibers of cotton away from its seed. To further aid the files in adapting themselves to the tension of the saws in their attempt to constantly rotate, I shape the plungers 27 as thin springs in the region 56, between the bearing and the file handle. This enables the file to yield a little and to do its work better than if it were rigidly held. The file handle 26 is provided with a set screw 57 whereby the handle may be secured upon the cylindrical plunger 27 after being rotated into position thereon with any one of the corners of the file set at the proper angle to work.

It will thus be seen that this machine is adapted to do the work of filing gin saws without removing them from their working arbor, the whole operation being automatic excepting the moving of the carriage and placing the saws in the machine.

Having thus described my invention, what I believe to be new, and desire to secure by Letters Patent, is the following:

1. The combination in a gin-saw filing machine, of a frame having side rails; a carriage fitted to slide upon the rails and provided with lugs to engage the rails, one of the said lugs being loose; a file carrying sash journaled to tilt in the carriage and a binding screw provided with a cam to engage the said sash and threaded into the said loose lug, substantially as described.

2. The combination in a gin-saw filing machine, of a carriage; a file carrying sash journaled to tilt in the carriage; a speed pulley journaled at the rear end of the sash and connected with a file located at the forward end of the sash; a drive-wheel journaled in the carriage and a belt connecting the said drive-wheel and speed pulley, and hanging in the direction of movement of the tilting sash whereby the sash when disengaged will be tilted and raise the files out of engagement with the saws, substantially as described.

In testimony whereof I affix my signature in presence of two witnesses.

JAMES C. McCURRY.

Witnesses:
DAN T. LEARY,
M. A. PAXON.